United States Patent [19]

Cloete et al.

[11] 3,957,635

[45] May 18, 1976

[54] CONTACTING LIQUIDS AND SOLIDS IN COUNTERCURRENT

[75] Inventors: Francis Louis Dirk Cloete; Alan Keith Haines, both of Johannesburg, South Africa

[73] Assignee: National Institute of Metallurgy, Johannesburg, South Africa

[22] Filed: Jan. 23, 1974

[21] Appl. No.: 435,686

Related U.S. Application Data

[63] Continuation of Ser. No. 251,201, May 8, 1972, abandoned.

[30] Foreign Application Priority Data

May 14, 1971 South Africa.................... 71/3139

[52] U.S. Cl. ............................. 210/24; 23/270 R; 210/189
[51] Int. Cl.² ..................................... B01D 15/02
[58] Field of Search ............... 202/158; 210/24, 33, 210/189, 195, 284, 291, 268; 261/114 A, 114 R; 23/270 R, 288 D, 288 G, 288 S

[56] References Cited
UNITED STATES PATENTS 894,792  7/1908  Eschellmann et al........... 261/114 R 3,549,526  12/1970  Brown................................. 210/33

FOREIGN PATENTS OR APPLICATIONS 1,070,251  6/1967  United Kingdom

Primary Examiner—Charles N. Hart
Assistant Examiner—Ivars Cintins
Attorney, Agent, or Firm—Young & Thompson

[57] ABSTRACT

The invention is concerned with an improvement of the process and apparatus disclosed in British patent specification 1 070 251. Slids pass in countercurrent to a liquid through a number of stages. Liquid flow is cyclically pulsed so that during one part of a cycle the liquid flows upwardly, during another part the solids settle in the liquid and in still a further part solids pass between the stages and out of the last stage in countercurrent to the liquid flow. The improvement of the present invention is that the last stage is so valved that less solids can pass out of the system than can pass between the stages.

7 Claims, 4 Drawing Figures

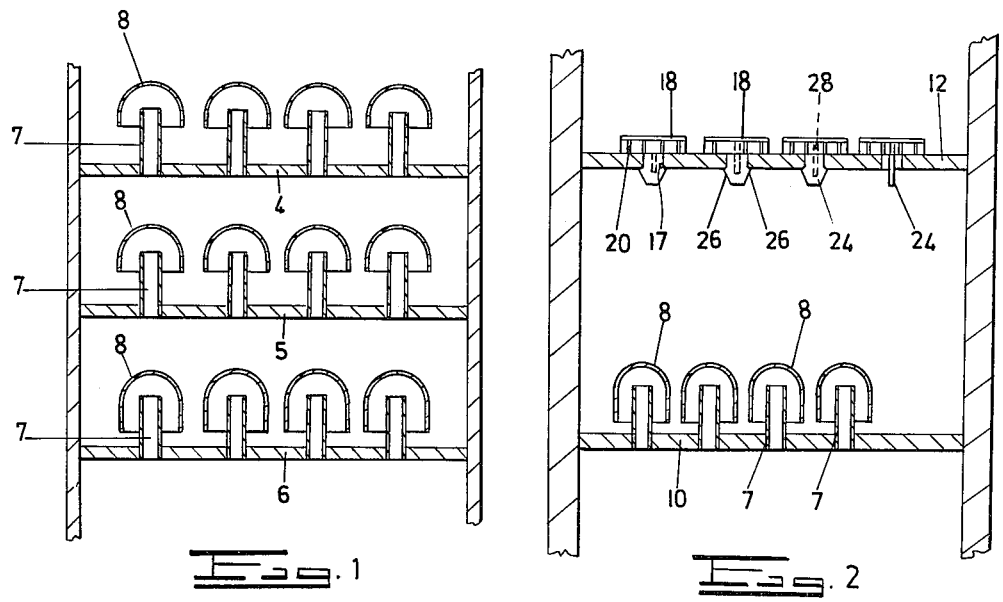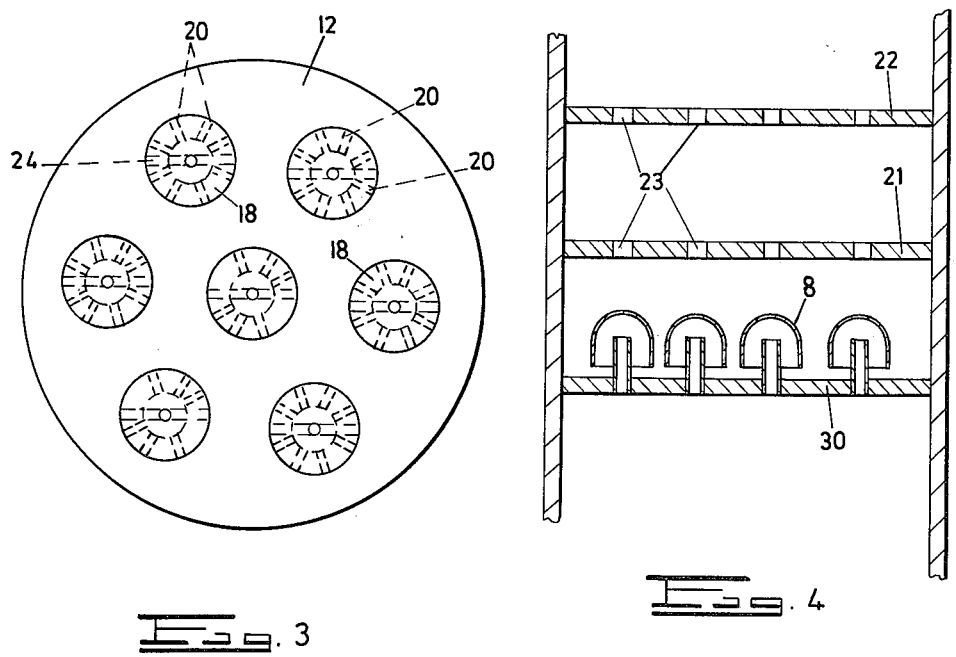

CONTACTING LIQUIDS AND SOLIDS IN COUNTERCURRENT

This is a continuation, of application Ser. No. 251,201, filed May 8, 1972, now abandoned.

This invention relates to the contacting of liquids and solids in countercurrent.

The kind of process with which the invention is concerned is described in British patent specification No. 1 070 251, which is hereinafter called "the British specification". Broadly the British specification discloses a process in which solids and a liquid are contacted in countercurrent in a series of stages, the solids flowing from a first stage to a last stage and out of the last stage, the liquid flowing from the last stage to the first stage and out of the first stage, and the rate of flow being cyclically varied so that during a first part of each cycle the solids are allowed to settle in the liquid phase in a second part are caused to pass from one stage to the next, while in a third part of the cycle liquid fluidises the solids and flows from the last stage towards the first stage.

Usually the stages are defined by a series of superimposed trays. It happens that even with the most careful design the volumes of solids transferred between trays is not always constant. Thus it happens that some of the trays below the top tray gradually lose their charge of solids with a consequent loss of efficiency in the contacting process.

An object of the invention is to provide a process in which the trays remain flooded with solids.

In the process broadly set out above the invention provides the improvement that the volume of solids that is caused to pass out of the last stage is less than the volume of solids that flows between any pair of stages.

The invention also provides the step of transferring solids from the last stage through a space also traversed by the liquid, the liquid flow being such that solids are displaced from the space by the liquid and the solids filling the space before they pass out of the last stage. It will be noted that in the British specification various embodiments of spaces of this kind are illustrated in the various embodiments. However, the spaces are the same volume between the various stages. The improvement of the invention is that the volume in the last stage is greater than between stages.

Essentially the present invention could be applied to any of the embodiments of the British specification the only modification being to hold up a larger volume of solids in the last stage.

The invention is further discussed with reference to the accompanying drawings, in which FIG. 1 is a section through an ion exchange column,
FIG. 2 is a section through another embodiment, and
FIG. 3 is a plan view of FIG. 2, and
FIG. 4 is a section through a further embodiment.

FIG. 1 is essentially FIG. 3 of the British specification modified for the purposes of the present invention. It illustrates a column formed with a series of trays of which 4, 5 and 6 are illustrated. The lower tray 6 represents the tray for the last stage in the column. Each of the trays has a series of chimneys 7 capped by a dome 8. However, the domes 8 of the tray 6 enclose a larger volume than the other domes.

The method of operation is the same as in the British specification. In other words, during the third part of the cycle of operations liquid clears solids from under the domes, during the first part solids settle above the tray, during the second part solids enter under the dome 8 and eventually pass through the chimney 7 to the stage below. The volume that eventually passes the tray 6 is less than that which passes the trays 4 and 5 because there was a large space to fill before solids could pass along the chimney.

FIGS. 2 and 3 illustrate a lowermost tray 10 and the one just above it, 12. All the trays above 12 are identical to it. The tray 10 is the same as the tray 6 described above.

The tray 12 has a series of perforations with caps 18. On its underside, each cap 18 has a number of radially extending spacers 20. Most of the spacers extend only a short radial distance inwardly. One spacer 20 extends diametrically across the cap 18. The height of the spacers 20 are all the same.

Projecting downwardly from the diametrically extending spacer 20 is a projection 24 the lower end of which is tapered. Near its base, each projection 24 has a pair of interference ears 26 so that the projection can be a pop fit into the perforation 17. A central vertically extending aperture 28 passes part way down the projection 24 to allow the latter to be compressed for insertion into the perforations. The caps 18 operate as the chimney and dome of the previous embodiment, but they are easier to make and install.

It is of the essence of this embodiment that the domes 8 enclose a larger volume than the caps 18 to ensure hold up of the solids on the tray 10 and all preceeding trays.

It has been found that there is no need for hold up means between stages. Thus the embodiment of FIG. 4 works very well. In this case a tray 30 defines the last stage and the trays 21 and 22 above it are simply provided with perforations 23. It has been found that provided that in the second part of a cycle less solids pass the tray 30 than can pass the trays 21 and 22, the process works without the need of the refinements provided by the British specification.

We claim:

1. In a process in which solids and a liquid are contacted in vertical countercurrent in a series of stages between which liquid and solids can flow in both directions, the solids being introduced into a first stage, the solids flowing from the first stage downwardly to a last stage and out of the last stage, liquid being introduced into the last stage, and the liquid flowing from the last stage upwardly to the first stage and out of the first stage, and the rate of flow being cyclically varied so that during a first part of each cycle the solids are allowed to settle in the liquid phase, in a second part are caused to pass from one stage to the next, while in a third part of the cycle liquid is caused to flow from the last stage towards the first stage while fluidizing the solids in its path, the improvement comprising restricting the flow of solids from the last stage relative to the flow of solids from any other stage during the second part of a cycle so that the volume of solids that is caused to pass out of the last stage is less than the volume of solids that can flow between any pair of stages during the second part of a cycle.

2. The process claimed in claim 1 including the step of transferring solids from the last stage through a space also traversed by the liquid, the liquid flow being such that solids are displaced from the space by the liquid in the third part of a cycle and the solids fill the space in the second part of a cycle before they pass out of the last stage.

3. Apparatus for contacting solids and a liquid comprising a series of vertically superposed compartments connected in series, means for introducing liquid under pressure to a last compartment, means for causing said liquid under pressure to flow from said last compartment upwardly to a first compartment, means for introducing solids to said first compartment, means for causing said solids to flow under a reverse pressure from the first compartment downwardly to the last compartment and out of the last compartment, there being solids in each said compartment, characterised in that means are provided allowing flow out of the last compartment, said means being so dimensioned as to allow a lesser volume of solids to flow out than can flow between compartments.

4. The apparatus claimed in claim 3 in which the compartments are defined above trays, each tray being perforated to allow liquid and solids to flow through the tray, and in which the tray defining the last compartment is provided with means for preventing the passage of solids therethrough except under positive pressure.

5. The apparatus claimed in claim 4 in which each tray is provided hold-up means, the hold-up means in the end tray accepting a larger volume than that of the other trays.

6. The apparatus claimed in claim 3 in which the compartments are defined between trays each tray being perforated to allow liquid and solids to pass through the tray and in which the perforations in the end tray of the last compartment are fitted with hold-up means that accepts a fixed volume of solids but prevents flow of solids except under positive pressure.

7. The apparatus claimed in claim 5 in which the hold-up means comprises a chimney projecting from the perforation and a dome capping the chimney.

* * * * *